United States Patent

Beck et al.

[11] Patent Number: 5,486,040
[45] Date of Patent: Jan. 23, 1996

[54] BRAKE PRESSURE CONTROLLER FOR A HYDRAULIC VEHICLE BRAKE SYSTEM

[75] Inventors: Erhard Beck, Weilburg; Dieter Dinkel, Eppstein, both of Germany

[73] Assignee: ITT Automotive Europe GmbH, Germany

[21] Appl. No.: 211,741

[22] PCT Filed: Aug. 14, 1992

[86] PCT No.: PCT/EP92/01863

§ 371 Date: Aug. 25, 1994

§ 102(e) Date: Aug. 25, 1994

[87] PCT Pub. No.: WO93/08053

PCT Pub. Date: Apr. 29, 1993

[30] Foreign Application Priority Data

Oct. 16, 1991 [DE] Germany .......... 41 34 214.3

[51] Int. Cl.[6] .............. B60T 8/34; B60T 8/48; B60T 8/42
[52] U.S. Cl. .................. 303/113.2; 303/115.4; 303/116.1; 303/119.1; 303/901; 303/84.1
[58] Field of Search .............. 303/113.2, 116.1, 303/116.2, 119.1, 900, 901, 115.4, 116.4, 68–69, 113.3, 115.1, 115.5, 10, 84.1, 84.2

[56] References Cited

U.S. PATENT DOCUMENTS

| | | |
|---|---|---|
| 5,000,525 | 3/1991 | Reinartz et al. |
| 5,152,586 | 10/1992 | Burgdorf .............. 303/113.2 |
| 5,297,862 | 3/1994 | Reinartz et al. ....... 303/116.1 |
| 5,383,718 | 1/1995 | Burgdorf et al. |

FOREIGN PATENT DOCUMENTS

| | | |
|---|---|---|
| 3439408 | 7/1986 | Germany . |
| 3831426 | 4/1989 | Germany . |
| 3807452 | 9/1989 | Germany . |
| 3808126 | 9/1989 | Germany . |
| 3900851 | 1/1990 | Germany . |
| 4011329 | 10/1991 | Germany . |
| 2194010 | 2/1988 | United Kingdom . |
| 91/12162 | 8/1991 | WIPO . |
| 92/05990 | 4/1992 | WIPO . |

*Primary Examiner*—Douglas C. Butler
*Attorney, Agent, or Firm*—Ratner & Prestia

[57] ABSTRACT

A brake pressure controller for a hydraulic vehicle brake system includes a master brake cylinder (1), a wheel brake cylinder (10, 11) connected thereto through a brake conduit (5), and a branch conduit (8, 9) which is provided in the brake conduit (5) between the master brake cylinder (1) and the wheel brake cylinder (10, 11). The brake system includes control valves (12, 14) and a pump (16) returning pressure fluid from a return conduit (15) into the brake conduit (5). At least one valve (6) is provided between the master brake cylinder (1) and the branch conduit (8, 9), which valve, in a first mode of operation, connects the outlet (17) of the pump (16) to the master brake cylinder (1) and, in a second mode of operation, discontinues the connection from the outlet (17) of the pump (16) to the master brake cylinder (1) and connects the inlet (24) of the pump (16) to the master brake cylinder (1) or a reservoir (4). The inlet (24) of the pump (16) includes a pressure holding valve (20), the opening pressure of which, in the first mode of operation, is above atmospheric pressure and, in the second mode of operation, is reduced to permit an automatic intake of pressure fluid to the pump (16).

10 Claims, 4 Drawing Sheets

BRAKE PRESSURE CONTROLLER FOR A HYDRAULIC VEHICLE BRAKE SYSTEM

BACKGROUND OF THE INVENTION

The present invention is concerned with a brake pressure controller for a hydraulic vehicle brake system. The brake system includes a master cylinder, at least one wheel brake cylinder for actuating a brake and a brake conduit for providing pressure fluid communication between the wheel brake cylinder and the master brake cylinder. A brake pressure control circuit is provided in the brake conduit between the master brake cylinder and the wheel brake cylinder.

The brake system also includes a pump and control valves, controllable through a controller, which connect the wheel brake cylinder to the brake conduit or a return conduit leading to the inlet of the pump. The control valves include at least one valve provided in the brake conduit between the master brake cylinder and the brake pressure control circuit, which at least one valve, in a first operating mode, connects the outlet of the pump, through the brake conduit, to the master brake cylinder, and, in a second operating mode, discontinues the connection between the outlet of the pump and the master brake cylinder and permits a connection between the inlet of the pump and the master brake cylinder or a reservoir.

A brake pressure controller of the above-described type is known from German Patent No. DE-OS 38 31 426. The automatic control system of the brake pressure acting on the wheel brake cylinders responds to the rotating movement of one or several wheels of an automotive vehicle monitored by a monitoring system. The control system prevents the wheels from locking during a braking operation through brake slip control, and prevents the driven wheels from racing, during start-up, through traction slip control.

The first mode of operation is provided for brake slip control while the second mode of operation is provided for traction slip control. In known brake pressure control systems, the brake pressure cylinder, in the first mode of operation during a pressure reducing step for lowering the brake pressure, is connected only to a low-pressure accumulator and to the inlet of the pump. If the low pressure accumulator is empty, there is a danger that the pressure in the wheel brake cylinder may be lowered, through the intake force of the pump, to such an extent that a retraction of the brake piston and an ingress of air are likely to occur, which might affect the braking operation and the brake pressure control.

SUMMARY OF THE INVENTION

It is an object of the invention to improve a brake pressure controller of the above-mentioned type that, during operation, the pressure of a wheel brake cylinder cannot fall below atmospheric.

This problem, in the practice of the invention, is solved in that the inlet of the pump includes a pressure holding valve which is closed in the resting position. In the first mode of operation, the pressure holding valve requires, for opening, an excess pressure in the return conduit which is above atmospheric pressure. In the second mode of operation, the pressure holding valve requires only a slight opening pressure in the return conduit to enable an automatic intake of the pump.

The configuration according to the present invention prevents the brake pressure in the wheel brake cylinder from dropping below the opening pressure of the pressure holding valve which is above atmospheric pressure, during those instances of first mode of operation when the wheel brake cylinder is separated from the master brake cylinder. Even with a complete pressure decrease through corresponding control commands of the controller, a residual pressure of above 1 bar will be maintained in the return conduit so that an ingress of air or a withdrawal of the brake piston is effectively avoided.

In the second mode of operation, the wheel brakes of the driving wheels of the vehicle are controlled by the controller without actuating the master brake cylinder and, in this way, are automatically actuated. The required brake pressure is generated by the pump. The higher opening pressure of the pressure holding valve, which is operative in the first mode of operation, would prevent the automatic intake of pressure fluid from the master brake cylinder through the pump. However, in the invention, the automatic intake of pressure fluid through the pump is enabled in the second mode of operation. This is accomplished by reducing the opening pressure of the pressure holding valve in the second mode of operation of the brake pressure controller.

In one embodiment of the present invention, the pressure holding valve includes a spring-biased closure element to which is applied a first spring having a low opening force in the second mode of operation, and to which is applied a second spring having a higher opening force in the first mode of operation. A piston, responsive to a control pressure, in particular, the pressure of the master brake cylinder, aids in applying the second spring to the closure element. Thus, the pressure holding valve, depending on the mode of operation, is switched over to the appropriate opening pressure.

In a preferred embodiment of the invention, the pressure holding valve is the suction valve of the pump, and the piston consists of a cylindrical sleeve disposed in the pressure chamber of the pump between the pump piston and the suction valve. The ends of the piston have identical diameters sealed against the pressure chamber. The central section of the sleeve has a larger diameter confining an annular chamber to which a control pressure can be applied. To enhance the closing force, either an additional spring may be provided which, through displacement of the piston, will engage the closure element, or otherwise the preload of a single spring can be increased by displacing the piston. Moreover, the piston may be disposed in the intake chamber, with the effect of a spring acting in the opening direction for reducing the opening pressure, additionally, being variable by actuation of the piston.

According to another embodiment of the invention, the opening pressure of the pressure holding valve is unchanged and, in place, a hydrodynamic charging pump is disposed ahead of the pressure holding valve. In the second mode of operation, the charging pump generates a pressure in the return conduit exceeding the opening pressure of the pressure holding valve. In this embodiment, the pressure holding valve can also be formed as the suction valve of the pump, which would require the force of the valve spring acting on the closure member to be increased. As the opening pressure of the pressure holding valve is comparatively low, a hydrodynamic pump of a very simple design may be provided which is just able to overcome the opening pressure of the pressure holding valve and to feed, as a charging pump, the piston pump with pressure fluid provided for the brake pressure generation.

The hydrodynamic charging pump, in this embodiment, can be connected, in parallel to the pump and in the return conduit and be actuated together with the pump. The inlet of the hydrodynamic charging pump can be in communication with the master brake cylinder or the reservoir and, in the first mode of operation, this communication can be blocked through a valve closing in response to pressure. This embodiment involves the advantage that the charging pump does not require a separate driving motor and can be integrated into the pump.

In this embodiment, as the charging pump is actuated, the pump inlet, in the first mode of operation, is blocked by a valve to eliminate the charging effect. The valve is actualize in an electromagnetic or hydraulic manner. An embodiment in which the valve, through the pressure of the master brake cylinder, is switched into its blocking position, as through actuation of the master brake cylinder is particularly advantageous.

According to another embodiment of the present invention, a brake pressure controller may be used for a dual-circuit brake system having two separate circuits, each of which includes a pump and a pressure holding valve. For reducing the structural efforts, the intake conduits of the two brake circuits may be jointly connected to the outlet of the hydrodynamic charging pump, with the intake conduits of the two brake circuits being separated from one another by spring-loaded check valves. The independence of the two brake circuits required for safety reasons will, therefore, be maintained despite having a common charging pump.

According to another embodiment of the present invention, in the second mode of operation, the automatic intake of pressure fluid to the pump is enabled. In this embodiment, the pressure holding valve is disposed in the intake conduit upstream of the suction valve of the pump, and that between the suction valve and the pressure holding valve, a connecting conduit branches from the intake conduit. This connecting conduit leads to the master brake cylinder or a reservoir and contains a blocking valve which, in the first mode of operation, is closed and in the second mode of operation is open. In this embodiment, the pressure holding valve cannot replace the suction valve of the pump; however, the additional structural efforts in respect of measures eliminating the effect of the pressure holding valve in the second operating phase, are reduced.

The invention will now be described in detail with reference to some embodiments of the invention as shown in the drawing, wherein FIG. 1 schematically shows a brake circuit of a vehicle brake system according to the present invention having a brake pressure controller of the invention including a pressure holding valve with a variable opening pressure, FIG. 2 schematically shows a form of embodiment of the brake system according to FIG. 1 having a modified valve system in the brake circuit, FIG. 3 schematically shows another embodiment of a brake circuit of a vehicle brake system of the present invention having a brake pressure controller and a pressure holding valve disposed ahead of the suction valve of the pump, and FIG. 4 schematically shows another embodiment of the present invention for two brake circuits of a vehicle brake system and having a charging pump associated with the pressure holding valve.

The hydraulic vehicle brake systems as shown in FIGS. 1 to 4 have in common a master brake cylinder 1 comprising a vacuum brake force booster 2 actuable by a brake pedal 3.

Provided on the master brake cylinder 1 is a reservoir 4 containing a pressure fluid stock and connected, in the brake release position, to the working chambers of the master brake cylinder 1.

The brake circuits as shown respectively comprise a brake conduit 5 in communication with a working chamber of the master brake cylinder 1. An electromagnetically actuable valve means 6, in its resting position, forms an open passageway for the brake conduit 5 and, through energizing the actuating magnet thereof, is switched into a blocking position in which the brake conduit 5 is blocked toward the working chamber of the master brake cylinder. In the opposite flow direction, the brake conduit 5 remains open through a check valve 7 connected in parallel to the valve means 6. Connected to the brake conduit 5 are branch conduits 8, 9 each leading to a wheel brake cylinder 10 and 11, respectively. The branch conduits 8, 9 each contain an electromagnetically actuable inlet valve 12 which, in its resting position, is open and, through energizing its actuating magnet, can be switched into a blocking position. Connected to each branch conduit 8 and 9 and in parallel to each inlet valve 12 is a check valve 13 opening toward the master brake cylinder 1.

Moreover, the wheel brake cylinders 10, 11, through the branch conduits 8, 9 are connected to electromagnetically actuable outlet valves 14 which are blocked in their resting position and, through energizing the actuating magnet thereof, can be switched into an open position wherein they connect the wheel brake cylinders 10, 11 to a return conduit 15. The return conduit 15 leads to the inlet of a hydrostatic pump 16 the outlet of which, through a pressure valve 17, is connected to the section of the brake conduit 5 in communication with the branch conduits 8, 9. The return conduit 15 is connected to a low pressure accumulator 18 taking up excessive pressure fluid during opening of the outlet valves 14 until the excessive pressure fluid is fed back through the pump 16. The return conduit 15, moreover, is in communication with a connecting conduit 19 which, in the example of embodiment according to FIG. 1, is or can be connected to the reservoir 4 and, in the remainder of the embodiments, is or can be connected to the section of the brake conduit 5 between the master cylinder and valve 6.

Figure 1:
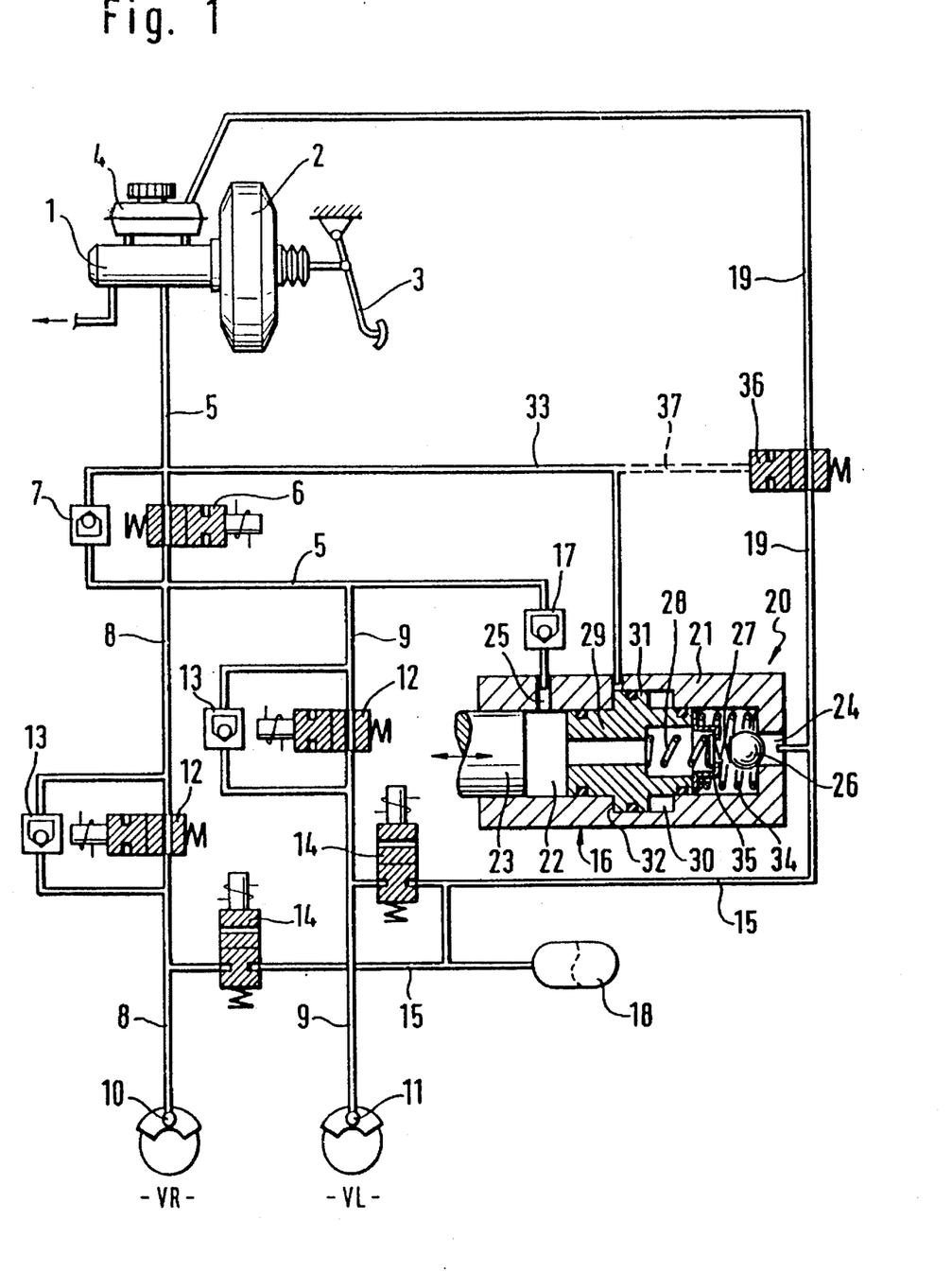
Figure 2:
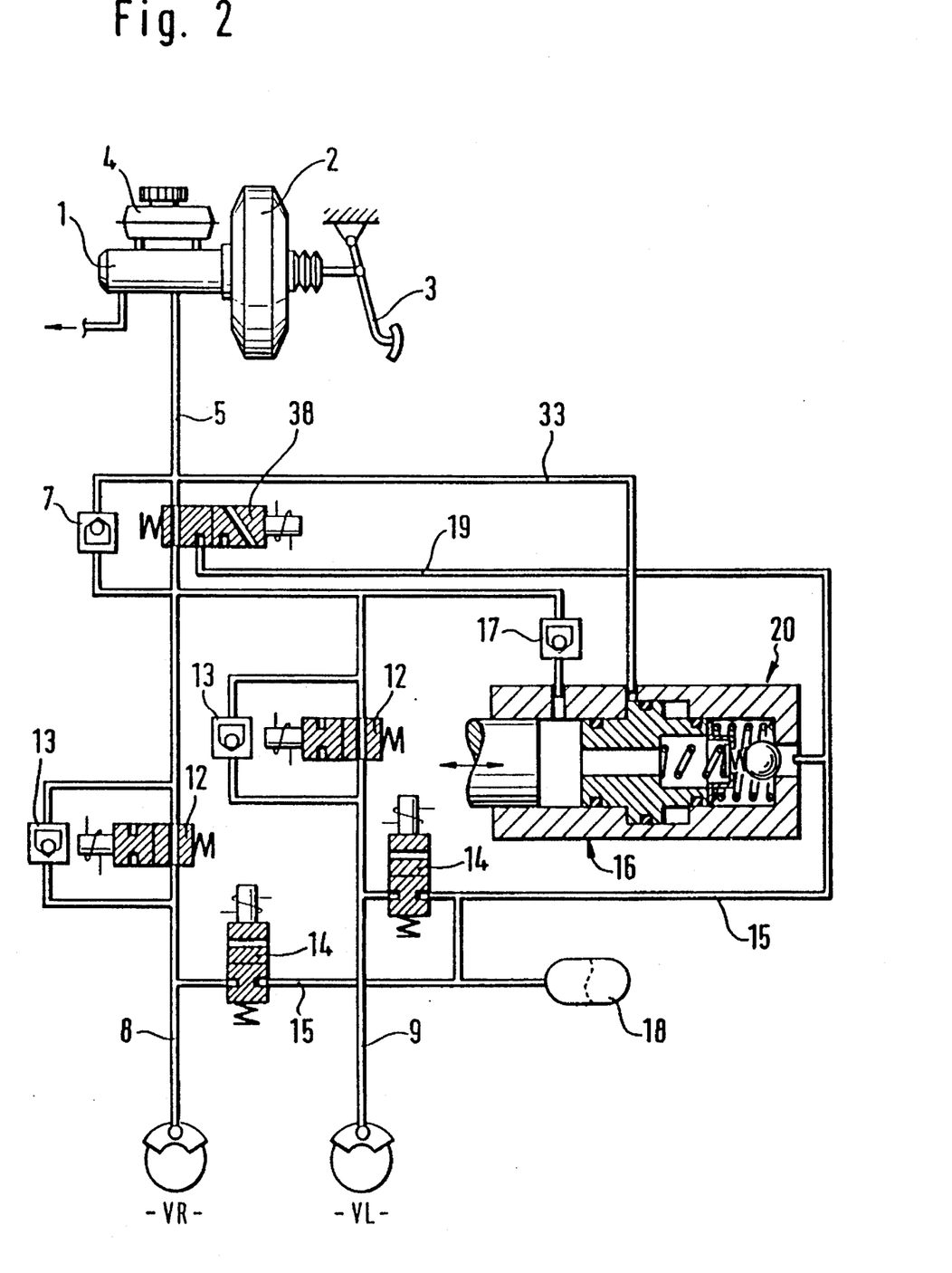

In the examples of embodiment as shown in FIGS. 1 and 2, the suction valve of the pump 16 is in the form of a pressure holding valve 20, the opening pressure of which is variable depending on the mode of operation. A part of a housing 21 of pump 16 contains a pressure chamber 22 formed by a cylindrical bore confined by the axially movable pump piston 23. The pressure chamber 22, through an inlet bore 24 provided in the front side thereof, is connected to the return conduit 15 and, through a lateral outlet bore 25, is connected to the pressure valve 17. The inlet bore 24 is closed through a valve ball 26 provided within the pressure chamber and supported, through two-series arranged compression springs 27, 28, on a piston 29.

The piston 29 is in the form of a cylindrical sleeve, the ends of which have identical diameters and are sealed against the bore forming the pressure chamber 22. Provided between the sealed ends of the piston 29 is an expanded, cylindrical annular chamber 30 in which a larger-diameter central section 31 of the piston 29 is axially displaceable and is sealed against the cylindrical wall of the annular chamber 30.

The central section 31, in this manner, confines an annular control chamber 32 which, through a control conduit 33 is in communication with the brake conduit 5 at a point between the master cylinder 1 and the valve means 6. The piston 29, through a control spring 34, is held in the position as shown in the drawing once the master brake cylinder is in an inactive position, e.g. in the brake release position. Located between the compression springs 27, 28 is a spring retainer which is supported on a stop sleeve 35 connected to the piston 29, thereby maintaining the compression spring 28 preloaded which spring 28 is stronger compared to compression spring 27.

Disposed in the connecting conduit 19 is a pressure-controlled valve 36, the control conduit 37 of which is in communication with the control conduit 33. The valve 36 is open in the resting position thereof and, through applying pressure to the control conduit 37, can be switched into a blocking position in which the connecting conduit 19 is blocked.

FIG. 1 shows the brake circuit of the brake system in the resting position in which the brakes VR, VL associated with the wheel brake cylinders 10, 11 located on the driven front axle of the vehicle, are not actuated.

To initiate a braking operation, the master brake cylinder 1 is actuated through the brake pedal 3 and the brake force booster 2, and a pressure is generated in the brake conduit 5 and in the branch conduits 8, 9 as well as in the wheel brake cylinders 10 coupled thereto. In this way, pressure is applied to the brakes VR, VL. In this first mode of operation of the brake circuit, the valve means 6 is not actuated so that it remains in the open position as shown.

The pressure in the brake conduit 5, through the control conduit 33, 37 is fed into the control chamber 32 and to the valve 36, thereby switching the valve 36 into its blocking position and pushing piston 29 to the right against the force of the control spring 34. This causes the compression spring 28 to directly act on the valve ball 26 and increases the pressure in the inlet bore required for opening the pressure holding valve 20 to about 1.3 bar.

If, during the braking operation, a control of the brake slip on the brakes VR, VL, is now required to preclude a blocking of the wheels, the outlet valves 14 and the inlet valves 12, in a known manner, are alternately actuated by the controller. Also, the pump drive of the pump 16 is activated. In the pressure reducing phase, through the closed inlet valves 12, the wheel brake cylinders 10, 11 are separated from the master brake cylinder 1 and, through the opened outlet valves 14, are in communication with the return conduit 15. The pressure fluid escaping from the wheel brake cylinders 10, 11 into the return conduit 15, first, is taken up by the low pressure accumulator 18 and is fed by pump 16 back into the brake conduit 5. Because of the higher opening pressure of the pressure holding valve 20, the pressure on the wheel brake cylinders 10, 11 cannot decrease below atmospheric pressure so that an ingress of air and a withdrawal of the brake piston are reliably avoided.

In the second mode of operation, the brakes VR, VL are automatically actuated by the controller once the master brake cylinder 1 is inoperative, in order to control, in a start-up process, the traction slip on the driving wheels and to prevent the driving wheels from racing.

In this respect, the valve means 6 is actuated by the controller, thereby separating the master brake cylinder 1 from the branch conduits 8, 9. At the same time, the drive of pump 16 is activated. As the control conduits 33, 37, in that mode of operation, remain non-pressurized, the valve 36 remains in the open position and the piston 29 remains in the basic position caused by the control spring 34. In that position, only the weak compression spring 27 is operative on the valve ball 26, which corresponds to a differential pressure of about 0.2 bar between the inlet bore 24 and the pressure chamber 22. That low differential pressure enables an automatic intake of pressure fluid through the pump 16 via the connecting conduit 19 from the reservoir 4. Thus, a supply of pressure fluid is conducted through the pressure valve 17 and the branch conduits 8, 9 to the wheel brake cylinders 10, 11, thereby actuating the brakes VR, VL.

The extent of actuation of the brakes is controlled through alternately actuating the inlet valves 12 and the outlet valves 14 as it is in a brake slip control. In this mode of operation, the return conduit 15, through the connecting conduit 19, is in permanent communication with the reservoir 4 to preclude a decrease in the pressure in the wheel brake cylinders to below atmospheric pressure during the pressure reducing phase. Accordingly, also in this operating phase, an ingress of air or a withdrawal of the brake piston will not take place.

The embodiment according to FIG. 2 distinguishes from the one according to FIG. 1 substantially in that the valve means 6 and the valve 36 are replaced by an electromagnetically actuated valve means 38 disposed in the brake conduit 5 in lieu of the valve means 6. The valve means 38 comprises a 2-way/3-position valve which, in the resting position thereof, forms an open passageway for the brake conduit 5 and blocks the nozzle of the connecting conduit 19. In its actuating position caused by energizing the actuating magnet, valve means 38 connects the connecting conduit 19 to the section of the brake conduit 5 leading to the master brake cylinder 1, and blocks the section of the brake conduit 5 in communication with the branch conduits 8, 9. In that actuating position of the valve means 38 enabling the second mode of operation, the connecting conduit is not directly connected to the reservoir 4 but rather through the working chamber of the master cylinder 1, as opposed to the embodiment according to FIG. 1. However, this does not affect the operation as the master cylinder 1 is not actuated during the second mode of operation so the working chamber is in communication with the reservoir 4.

If, during the second mode of operation, i.e. during a control of the traction slip, a braking process is initiated through actuation of the master brake cylinder, the brake pressure provided through the master brake cylinder 1 can propagate through the check valve 7, into the branch conduits 8, 9. At the same time, the actuation of the master brake cylinder 1 is detected by pressure-sensors or way sensors and is transferred to the controller, thereby causing a switch to the first mode of operation, restoring the valve means 6, 38 to the resting position.

Figure 3:
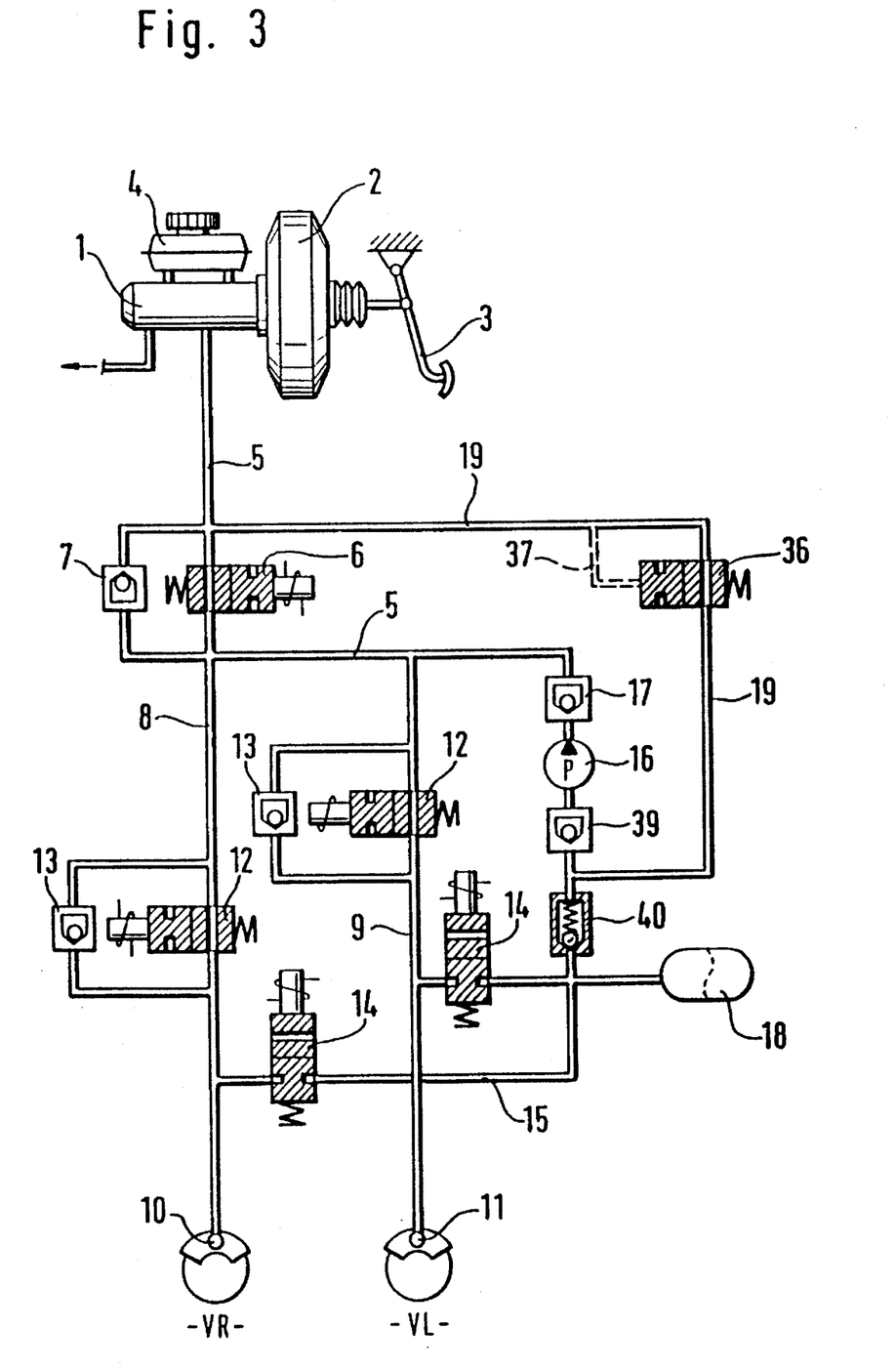

In the embodiment according to FIG. 3, the pump 16 comprises a suction valve 39, the opening pressure of which is in the range of 0.2 bar so that pressure fluid can be automatically taken in by the pump 16. Disposed upstream of the suction valve 39 is a pressure holding valve 40, the opening pressure of which, invariably, is at about 1.3 bar. The connecting conduit 19 contains, as in the embodiment according to FIG. 1, a pressure-controlled valve 36, with one end connected to the return conduit 15 between the suction valve 39 and the pressure holding valve 40, and the other end connected to the section of brake conduit 5 in communication with the master brake cylinder 1.

In the brake controller according to FIG. 3, a pressure is generated in the brake conduit 5 in the first mode of operation through actuation of the master brake cylinder 1, which switches the valve 36 into the blocking position. The pump 16 can only take in pressure fluid through the suction valve 39 and the pressure holding valve 40, with the higher opening pressure of the pressure holding valve 40 preventing the pressure on the wheel brake cylinders 10, 11 from decreasing below atmospheric pressure.

In the second mode of operation, in which the master brake cylinder 1 is not actuated, the valve 36 will remain in the open position while the valve means 6 is switched into the closing position. Now, the pump 16, through the suction valve 39, the connecting conduit 19 and the brake conduit 5 can take in pressure fluid from the master brake cylinder 1, feeding pressure fluid the same to the wheel brake cylinder 10, 11 for automatically actuating the brakes. A pressure reduction for reducing the brake force is effected during opening of the outlet valves 14 in either mode of operation through the pressure holding valve 40 so that, during operation, the pressure in the wheel brake cylinders 10, 11, is not completely decreased down to atmospheric pressure. Only after termination of the respective braking operation, through return of the valve means 6 and the inlet valves 12 into their open resting position, a complete pressure decrease in the wheel brake cylinders 10, 11 is attained through flow-back of the pressure fluid to the master brake cylinder 1.

FIGS. 1 to 3 show three different alternatives for connecting the connecting conduit 19 to the master brake cylinder 1 and/or the reservoir 4 to permit the intake of pressure fluid through the pump in the second phase of operation. All three alternatives are of equivalent effect and are, therefore, respectively exchangeable.

Figure 4:
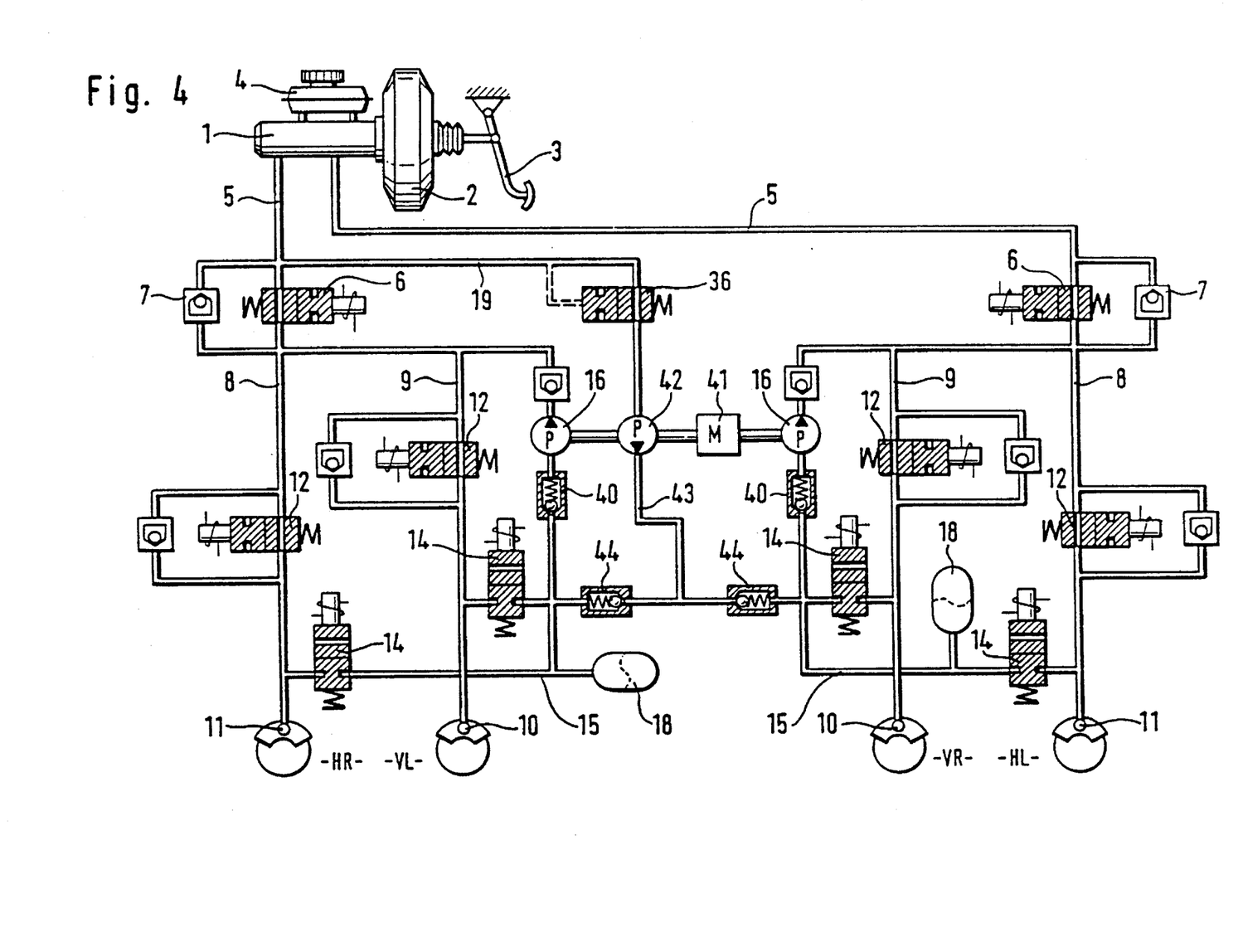

The example of embodiment of FIG. 4 shows both brake circuits of a vehicle brake system. The two brake circuits are of identical design and correspond to the examples of embodiment described above. Connected to each brake circuit is a wheel brake cylinder 10 for actuating a front wheel brake and a wheel brake cylinder 11 for actuating a rear wheel brake such that the brakes associated to a brake circuit are located on the vehicle wheels disposed in diagonal relationship.

For brake pressure control purposes, each brake circuit is connected to a separate hydrostatic pump 16 the suction valve of which is formed as a pressure holding valve 40 of a constant, higher opening pressure. The two pumps 16 are driven by a common drive 41. To permit, in the second mode of operation for controlling the traction slip, an intake of pressure fluid through pumps 16, a hydrodynamic charging pump 42 is provided which is equally actuated by drive 41. The intake side of the charging pump 42 is connected to the branch of the brake conduit 5 of a brake circuit leading to the master brake cylinder 1 through a connecting conduit 19 containing a valve 36 switching in response to pressure. From the pressure side of the charging pump 42, a charging pressure conduit 43, respectively through a spring-loaded check valve 44, leads to the two return conduits 15 of the two brake circuits. The check valves 44 insure that the two brake circuits remain hydraulically separate from one another.

During a braking operation caused by actuation of the master brake cylinder 1, the valve 36 will be closed so that, in a brake slip control action, the charging pump 42 jointly driven with the pumps 16, cannot take in pressure fluid through the connecting conduit 19. Accordingly, pressure fluid is supplied to the pumps 16 only as long as the pressure in the return conduits 15 is above the opening pressure of the pressure holding valves 40.

If the brakes VL, VR are to be automatically actuated for controlling traction slip, after actuating the valve means 6 and activating the pump drive 41, the charging pump 42, through the open valve 36 and the connecting conduit 19, can take in pressure fluid from the master brake cylinder 1. Pressure fluid can then be fed through the charging pressure conduit 43 and the check valves 44, into the return conduits 15 of the brake circuits. This causes the pressure to rise in the return conduits 15 to such an extent that the pressure holding valves 40 are opened and the pumps 16 are enabled to feed, in the required manner, pressure fluid to the brake circuits. The charging pump 42 is so designed that the volumetric delivery thereof, at the pressure required for opening the pressure holding valves 40, exceeds the combined volumetric delivery of the two pumps 16, thereby insuring that each pump 16 receives an adequate amount of pressure fluid.

It goes without saying that an assembly can, equally, be used in which each hydrostatic pump 16 comprises a charging pump 42 of its own taking the pressure fluid from the brake conduit associated thereto. In an assembly of that type, both brake circuits remain completely separate so that check valves 44 are not needed. If only one circuit is required for controlling the traction slip because the brakes of the two driven wheels are connected to the same brake circuit, it will be adequate for only such brake circuit to be provided with a charging pump 42 as the other brake circuit is operated only in the first mode of operation.

LIST OF REFERENCE NUMERALS

1 master brake cylinder
2 vacuum brake force booster
3 brake pedal
4 reservoir
5 brake conduit
6 valve means
7 check valve
8, 9 branch conduit
10, 11 wheel brake cylinder
12 inlet valve
13 check valve
14 outlet valve
15 return conduit
16 pump
17 pressure valve
18 low pressure accumulator
19 connecting conduit
20 pressure holding valve
21 housing
22 pressure chamber
23 pump piston
24 inlet bore
25 outlet bore
26 valve ball
27,28 compression spring
29 piston
30 annular chamber
31 larger diameter central section
32 control chamber
33 control conduit
34 control spring
35 stop sleeve
36 valve 37 control conduit
38 valve means
39 suction valve
40 pressure holding valve
41 drive
42 charging pump
43 charging pressure conduit
44 check valve

We claim:

1. A brake system for controlling fluid pressure in a wheel brake during normal braking, brake slip control and traction slip control, said brake system comprising:

a wheel brake;

a brake pedal;

a pressure fluid reservoir containing a pressure fluid;

a master brake cylinder in fluid communication with said pressure fluid reservoir and responsive to movement of said brake pedal for developing a pressure build up of pressure fluid in said master brake cylinder in response to actuation of said brake pedal;

a pump having an inlet and an outlet;

an auxiliary source of pressure fluid containing pressure fluid in fluid communication with said inlet of said pump;

first control means extending between said master brake cylinder and said wheel brake for:
  (a) controlling pressure fluid flow from and to said master brake cylinder,
  (b) permitting pressure fluid flow between said master brake cylinder and said wheel brake during normal braking as said brake pedal is actuated and without sensing a tendency of wheel lock,
  (c) regulating pressure fluid flow to said wheel brake during brake slip control as a tendency of wheel lock is sensed, and
  (d) preventing pressure fluid flow through said first control means to said master brake cylinder during traction slip control as wheel slippage is sensed;

second control means extending between said inlet of said pump and said pressure fluid reservoir for:
  (a) preventing pressure fluid flow between said pressure fluid reservoir and said inlet of said pump during normal braking and brake slip control, and
  (b) permitting pressure fluid flow between said pressure fluid reservoir and said inlet of said pump during traction slip control;

a pressure holding valve, disposed at said inlet of said pump, including a housing defining a cylindrical bore and including:
  (a) a piston axially slidable within said cylindrical bore,
  (b) a valve ball taking support on said piston through a first and a second compression spring which are arranged in series,
  (c) a stop sleeve coupled to said piston, and
  (d) a spring retainer disposed between said first and second compression springs and supported by said stop sleeve for placing said first compression spring under a greater preload than said second compression spring;

said pressure holding valve for:
  (a) permitting pressure fluid flow from said wheel brake to said pump only when the pressure of said wheel brake exceeds an opening pressure in excess of atmospheric pressure:
    (i) when pressure fluid flow between said master brake cylinder and said wheel brake is permitted during normal braking, and
    (ii) when pressure fluid flow between said master brake cylinder and said wheel brake is regulated during brake slip control, and
  (b) permitting pressure fluid flow from said pressure fluid reservoir to said pump upon activation of said pump in the absence of pressure fluid flow from said master brake cylinder to said first control means when said brake pedal is not actuated during traction slip control; and third control means extending between said outlet of said pump and said first control means for conducting pressure fluid flow from said outlet of said pump to said first control means during brake slip control and traction slip control.

2. A brake system in accordance with claim 1 wherein said opening pressure of said pressure holding valve is reduced during traction slip control.

3. A brake system in accordance with claim 1 wherein, in the absence of a pressure build up in said master brake cylinder, said valve ball is resisted by said second compression spring and, in response to a pressure build up in said master brake cylinder, said piston, moves to cause said first compression spring to resist movement of said valve ball.

4. A brake system in accordance with claim 3 wherein:

said pump has a pressure chamber and a pump piston; and said piston of said pressure holding valve:
  (a) is formed of a cylindrical sleeve disposed in said pressure chamber of said pump between said pump piston and a suction valve which is closed by said valve ball,
  (b) has a first end which is sealed against said pressure chamber and is of identical diameter with a second end, and
  (c) has a larger-diameter central section confining an annular chamber to which the pressure build up in said master brake cylinder is applied.

5. A brake system in accordance with claim 1, wherein:

said first control means include a brake conduit in fluid communication with said master brake cylinder;

said second control means include a connecting conduit connected to said inlet of said pump; and said first control means and said second control means include a 2-way/3-position valve connected to said brake conduit and said connecting conduit for:
  (a) preventing pressure fluid flow between said master brake cylinder and said inlet of said pump during normal braking and brake slip control,
  (b) permitting pressure fluid flow between said pressure fluid reservoir through said master brake cylinder and said inlet of said pump during traction slip control, and
  (c) permitting pressure fluid flow between said master brake cylinder and said wheel brake during normal braking and brake slip control.

6. A brake pressure controller for a hydraulic vehicle brake system comprising a master brake cylinder, at least one wheel brake cylinder in communication with the master brake cylinder through a brake conduit for actuating a brake, a brake pressure control circuit provided in the brake conduit between the master brake cylinder and the wheel brake cylinder and containing a pump and control valves controllable through a controller and connecting the wheel brake cylinder to the brake conduit and to a return conduit leading to the inlet of the pump, and comprising a valve means provided in the brake conduit between the master brake cylinder and the brake pressure control circuit, with the valve means connecting, in a first mode of operation, the outlet of the pump, through the brake conduit, to the master brake cylinder and, in a second mode of operation, disconnecting the outlet of the pump from the master brake cylinder and connecting the inlet of the pump to at least one of the master brake cylinder and a reservoir, wherein the inlet of the pump comprises a pressure holding valve closed in a resting position thereof and, in the first mode of operation, requiring for opening an excess pressure in the return conduit that is above atmospheric pressure, and, in the second mode of operation, permitting an automatic intake of the pump, characterized in that the pressure holding valve includes a valve ball which takes support on a piston through two compression springs arranged one behind the other, a spring retainer being provided between the compression springs which is supported on a stop sleeve coupled to the piston so that the compression spring is under preload which is stronger as compared to the compression spring.

7. A brake pressure controller according to claim 6, characterized in that the opening pressure of the pressure holding valve is reduced in the second mode of operation of the pressure controller.

8. A brake pressure controller according to claim 7, characterized in that the pressure holding valve comprises a spring-loaded closure element to which a low spring force corresponding to the second mode of operation, is applied and to which a spring force increasing the opening pressure is applied with the aid of a piston to which, in the first mode of operation, a control pressure, in particular, the pressure of the master brake cylinder can be applied.

9. A brake pressure controller according to claim 8, characterized in that the piston is formed of a cylindrical sleeve disposed in the pressure chamber of the pump between the pump piston and the suction valve, the ends of which of identical diameters are sealed against the pressure chamber, with the larger-diameter central section of piston confining an annular chamber to which control pressure can be applied.

10. A brake pressure controller according to claim 6, characterized in that the pressure holding valve is formed by the suction valve of the pump.

\* \* \* \* \*